United States Patent
Chakravarty et al.

(10) Patent No.: US 10,885,666 B2
(45) Date of Patent: Jan. 5, 2021

(54) HYBRID METRIC-TOPOLOGICAL CAMERA-BASED LOCALIZATION

(71) Applicant: Ford Global Technologies, LLC, Dearborn, MI (US)

(72) Inventors: Punarjay Chakravarty, Mountain View, CA (US); Tom Roussel, San Mateo, CA (US); Praveen Narayanan, San Jose, CA (US); Gaurav Pandey, Foster City, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 79 days.

(21) Appl. No.: 16/269,333

(22) Filed: Feb. 6, 2019

(65) Prior Publication Data

US 2020/0250850 A1    Aug. 6, 2020

(51) Int. Cl.
*G06T 7/73* (2017.01)

(52) U.S. Cl.
CPC ...... *G06T 7/74* (2017.01); *G06T 2207/10012* (2013.01); *G06T 2207/10028* (2013.01); *G06T 2207/20081* (2013.01); *G06T 2207/20084* (2013.01); *G06T 2207/30244* (2013.01)

(58) Field of Classification Search
CPC ............ G06T 7/74; G06T 2207/10012; G06T 2207/10028; G06T 2207/20081; G06T 2207/20084; G06T 2207/30244
See application file for complete search history.

(56) References Cited

U.S. PATENT DOCUMENTS

| | | |
|---|---|---|
| 9,910,444 B2 | 3/2018 | Eade |
| 10,062,010 B2 | 8/2018 | Kutliroff |
| 2015/0356782 A1 | 12/2015 | Miller |
| 2017/0046580 A1* | 2/2017 | Lu ............... H04N 7/181 |
| 2019/0094981 A1* | 3/2019 | Bradski ............ G02B 27/0093 |

FOREIGN PATENT DOCUMENTS

| | | |
|---|---|---|
| CN | 105225604 B | 1/2016 |
| WO | WO-2018112795 A1 | 6/2018 |

OTHER PUBLICATIONS

Naseer et al, "Deep Regression for Monocular Camera-based 6-DoF Global Localization in Outdoor Environments," 2017 IEEE/RSJ International Conference on Intelligent Robots and Systems (IROS), pp. 1525-1530 (6 pages) (Year: 2017).*
Vision-based Topological Map Building and Localisation using Persistent Features.
Visual Topometric Localization.

* cited by examiner

*Primary Examiner* — David F Dunphy
(74) *Attorney, Agent, or Firm* — David R. Stevens; Stevens Law Group

(57) ABSTRACT

Various examples of hybrid metric-topological camera-based localization are described. A single image sensor captures an input image of an environment. The input image is localized to one of a plurality of topological nodes of a hybrid simultaneous localization and mapping (SLAM) metric-topological map which describes the environment as the plurality of topological nodes at a plurality of discrete locations in the environment. A metric pose of the image sensor can be determined using a Perspective-n-Point (PnP) projection algorithm. A convolutional neural network (CNN) can be trained to localize the input image to one of the plurality of topological nodes and a direction of traversal through the environment.

19 Claims, 4 Drawing Sheets

400 ⟶

```
┌─────────────────────────────────────────────────────────────────────┐
│                                                                     │
│   RECEIVE DATA OF AN INPUT IMAGE OF AN ENVIRONMENT FROM A SINGLE IMAGE │
│                                SENSOR                               │
│                                 410                                 │
│                                                                     │
└─────────────────────────────────────────────────────────────────────┘
                                    │
                                    ▼
┌─────────────────────────────────────────────────────────────────────┐
│                                                                     │
│  LOCALIZE THE INPUT IMAGE TO ONE OF A PLURALITY OF TOPOLOGICAL NODES OF A │
│   HYBRID SIMULTANEOUS LOCALIZATION AND MAPPING (SLAM) METRIC-TOPOLOGICAL │
│    MAP WHICH DESCRIBES THE ENVIRONMENT AS THE PLURALITY OF TOPOLOGICAL │
│      NODES AT A PLURALITY OF DISCRETE LOCATIONS IN THE ENVIRONMENT  │
│                                 420                                 │
│                                                                     │
│   ┌─────────────────────────────────────────────────────────────┐   │
│   │   MATCH THE INPUT IMAGE TO THE ONE OF THE PLURALITY OF      │   │
│   │    TOPOLOGICAL NODES BY DEEP LEARNING-BASED IMAGE           │   │
│   │                     CLASSIFICATION                          │   │
│   │                          422                                │   │
│   └─────────────────────────────────────────────────────────────┘   │
│                              │                                      │
│                              ▼                                      │
│   ┌─────────────────────────────────────────────────────────────┐   │
│   │  PERFORM METRIC LOCALIZATION USING: (A) TWO-DIMENSIONAL (2D)│   │
│   │   IMAGE FEATURES MATCHED BETWEEN THE INPUT IMAGE AND A      │   │
│   │  STORED IMAGE FOR EACH OF THE TOPOLOGICAL NODES, AND (B) ONE│   │
│   │   OR MORE CORRESPONDING THREE-DIMENSIONAL (3D) REAL-WORLD   │   │
│   │                           POINTS                            │   │
│   │                            424                              │   │
│   └─────────────────────────────────────────────────────────────┘   │
│                              │                                      │
│                              ▼                                      │
│   ┌─────────────────────────────────────────────────────────────┐   │
│   │ DETERMINE A FULL SIX-DEGREES-OF-FREEDOM (6DoF) POSE OF THE  │   │
│   │            IMAGE SENSOR IN THE ENVIRONMENT                  │   │
│   │                          426                                │   │
│   └─────────────────────────────────────────────────────────────┘   │
│                                                                     │
└─────────────────────────────────────────────────────────────────────┘
```

FIG. 4

HYBRID METRIC-TOPOLOGICAL CAMERA-BASED LOCALIZATION

TECHNICAL FIELD

The present disclosure generally relates to localization and, more particularly, to hybrid metric-topological camera-based localization.

BACKGROUND

Simultaneous localization and mapping (SLAM) is a technique of robotic mapping and navigation as well as an important part of any autonomous platform, whether in the context of autonomous vehicles (AVs), unmanned aerial vehicles (UAVs, also known as drones) or indoor mobile robots. SLAM can be used to build up a map of an environment to localize an AV or robot in the incrementally-built map. Once the map of the environment is constructed, the mapping aspect of SLAM is typically deactivated, leaving the localization aspect of SLAM remaining in use for navigation of the AV or robot between locations in the map. Currently, most commercial techniques use expensive Light Detection and Ranging (LIDAR) detectors for both mapping and localization aspects of SLAM. However, this approach tends to be costly and hence less desirable.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 4 is a flowchart depicting an example process in accordance with an embodiment of the present disclosure.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Under a proposed scheme in accordance with the present disclosure, stereo vision or a depth sensor may be utilized for the initial mapping aspect of SLAM, while a single camera or image sensor may be utilized for the subsequent localization. Under the proposed scheme, a hybrid SLAM metric-topological map with topological nodes at discrete locations in a given environment may be constructed, generated or otherwise created, and an image from the camera/image sensor may be matched to a topological node in the map by deep learning-based image classification. Subsequently, metric localization may be performed using image features matched between the image from the camera/image sensor and images stored in a database for each topological node, as well as corresponding three-dimensional (3D) real-world points, to determine a full six-degrees-of-freedom (6DoF) pose of the camera/image sensor in the environment. Accordingly, the proposed scheme involves a hybrid approach to metric and topological localization. Moreover, the map may be continuously updated with every traversal of routes descried by the map.

Thus, under the proposed scheme in accordance with the present disclosure, SLAM may be bifurcated into a mapping aspect and a localization aspect. Under the proposed scheme, an AV/drone/robot may be localized in an environment using a single camera or image sensor with a previously constructed map of the environment. The map may first be built using stereo sensing and a conventional visual SLAM (vSLAM) algorithm such as the Oriented FAST and Rotated BRIEF (ORB) SLAM, or ORB SLAM. The conventional ORB SLAM map may include image keyframes, image keypoints within those keyframes, corresponding 3D locations, and the 6DoF pose of a camera/image sensor for each keyframe. Such keyframe-based vSLAM map, however, tends to be bulky (e.g., requiring multiple gigabytes of memory for a map of a large building) and may not be robust enough to accommodate changes in lighting conditions or other environmental changes.

Figure 1:
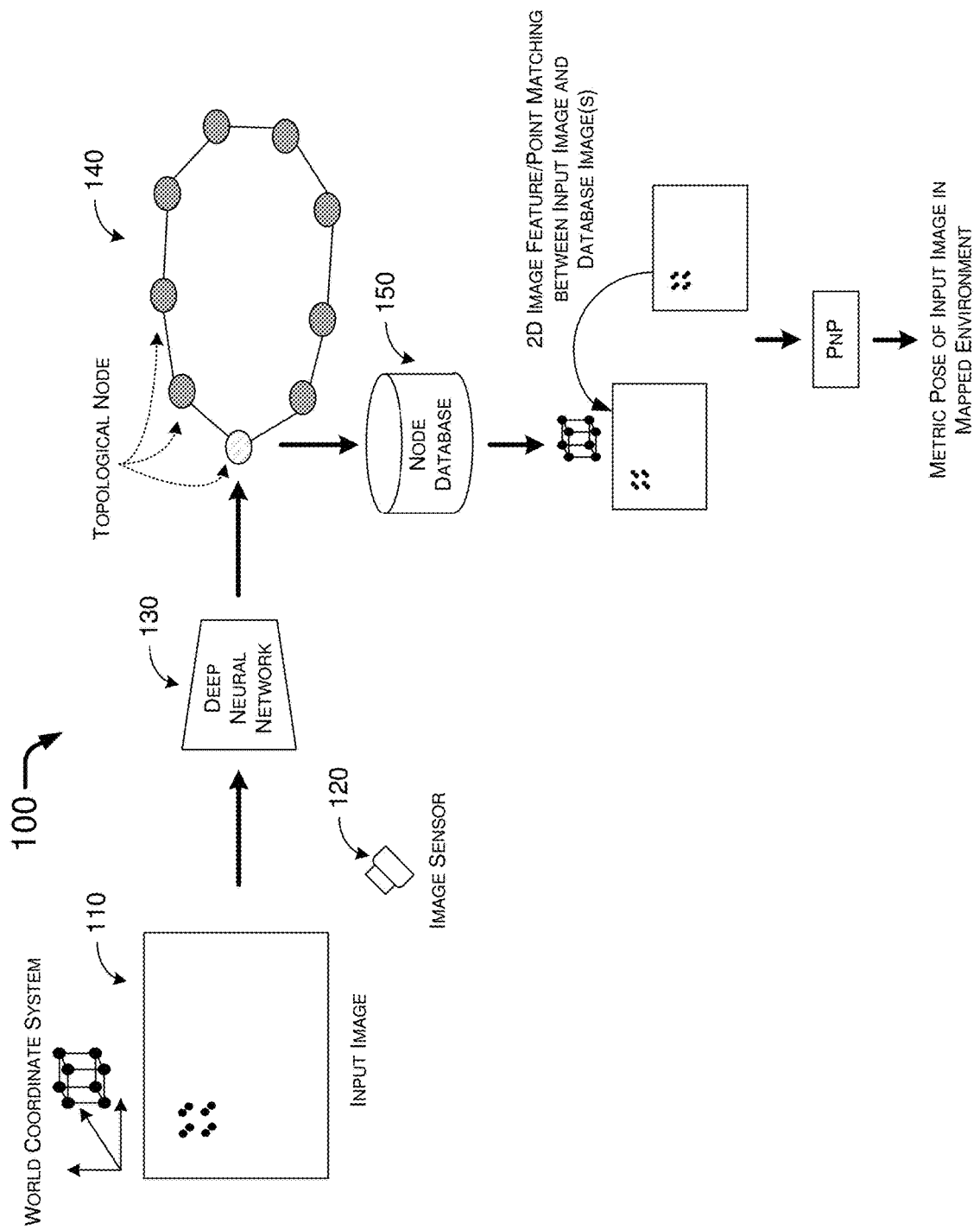
FIG. 1 is a diagram of an example scenario in accordance with an embodiment of the present disclosure.

FIG. 1 illustrates an example scenario 100 of the proposed scheme in accordance with the present disclosure. Scenario 100 involves constructing a map 140 that is a hybrid of topological and metric mapping. A topological map describes an environment as a set of topological nodes that are connected in a graph structure, whereas an AV/drone/robot in the environment described by the map may be localized to a nearest topological node. In contrast, with metric mapping, localization of an AV/drone/robot involves determining the full 6DoF pose of a camera/image sensor on the AV/drone/robot, including the six dimensions of [x, y, z, roll, pitch, yaw]. With a hybrid localization technique under the proposed scheme, a single image from a camera/image sensor may be utilized in two steps. Firstly, a location of the AV/drone/robot closest to a nearest topological node may be determined. Secondly, the location may be refined to obtain a full metric 6DoF pose.

An assumption under the proposed scheme is that the AV/drone/robot would follow predefined paths during its traversal through an environment, and this assumption is valid for Level 4 AVs in geo-fenced inner cities or a mobile robot in a warehouse or supermarket, for example. With this assumption, the topological map may be constructed along the trajectory of the mapping agent (e.g., an AV, drone or robot). The topological map may include a graph of topological nodes (which is a subset of the keyframes defined earlier), a metric pose of the camera/image sensor of the mapping agent associated with each node, and a selection of representative images associated with each node. Each of the images may also be associated with two-dimensional (2D) image keypoints and their corresponding depth values (e.g., using a stereo camera or a depth sensor available during mapping, which is not required during subsequent localization). Each topological node may be connected with one or more other topological nodes with a graph edge, and each graph edge may be associated with two or more images captured in opposite directions of traversal through the graph.

Referring to FIG. 1, a deep neural network 130 (e.g., a convolutional neural network (CNN)) may be trained to localize an input image 110 from an environment (e.g., along a route captured by a camera 120 of a mapping agent such as an AV, drone or robot) to one of a plurality of topological nodes in a graph of a topological map, along with a direction of travel of the mapping agent. The deep neural network 130 may be more robust to lighting changes and other environmental changes compared to other techniques using traditional, hand-crafted features such as ORB used in the ORB SLAM algorithm. The deep neural network 130 may also be updated or fine-tuned with every new image matched to a node of the graph of the topological map for map maintenance over time.

Figure 2:
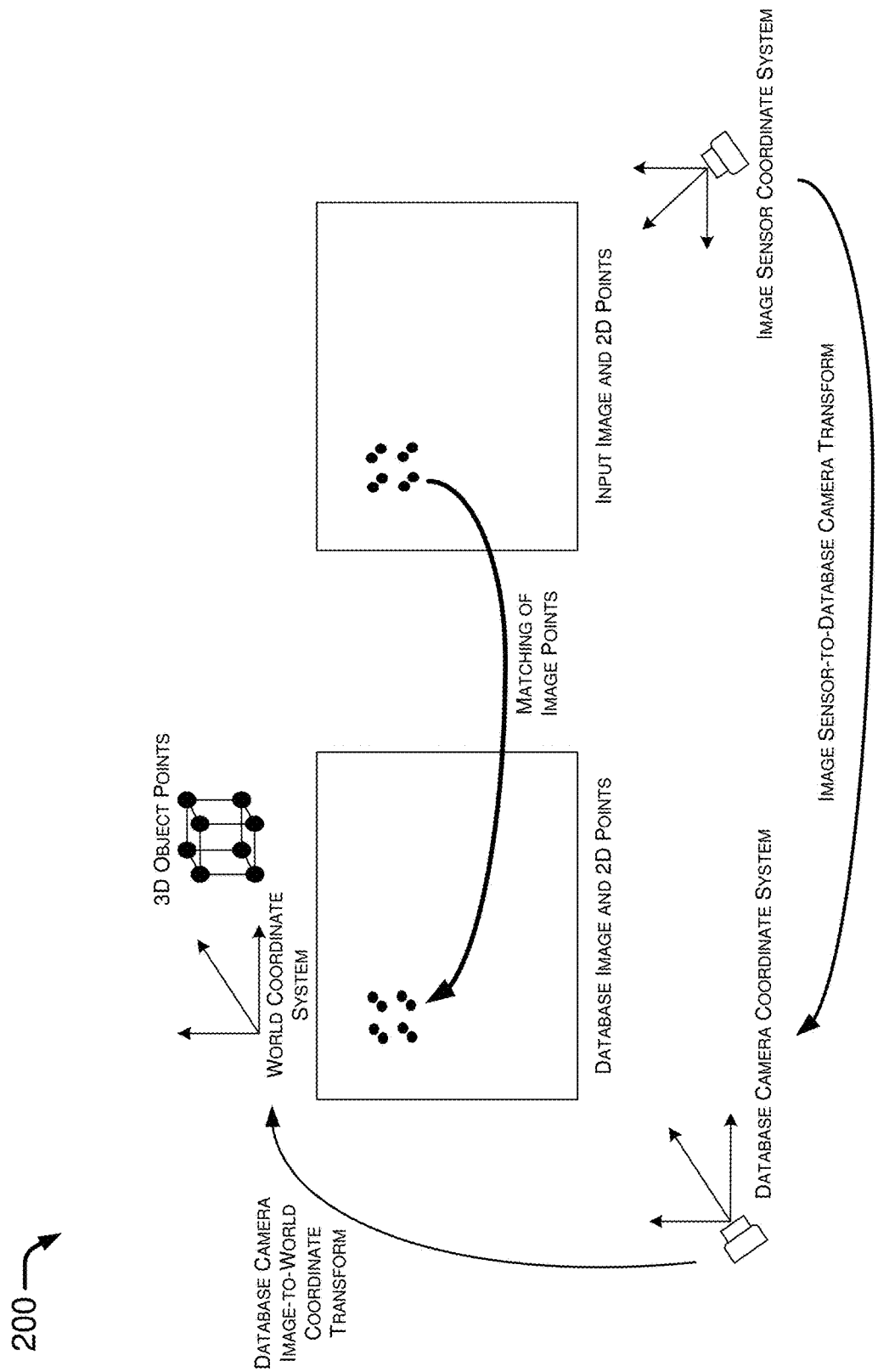
FIG. 2 is a diagram of an example scenario in accordance with an embodiment of the present disclosure.

Once a new image from camera 120 is localized to a topological node, an accurate metric pose of camera 120 (or the mapping agent itself in an event that an orientation of camera 120 is fixed on the mapping agent) that captures the new image. For instance, a Perspective-n-Point (PnP) projection algorithm may be utilized to determine the accurate metric pose. PnP is a classical geometric computer vision algorithm that provides 2D projections of 3D world points in an image and finds a pose of a camera that captures the image in a world coordinate frame. Under the proposed scheme, matched 2D features (e.g., 2D points) between a new image and a corresponding topological node image may be utilized to determine a relative pose of the image, or camera 120, compared with database images in a node database 150. Since the absolute pose of the topological image is known, the absolute pose of camera 120 that captures the new image, as well as its pose relative to the topological image, may be determined. FIG. 2 illustrates an example scenario 200 of matching a new camera image (e.g., input image captured by image sensor 120) and its corresponding 2D points to a database image (i.e., an image previously captured and stored in database 150) and its corresponding 2D points. As the absolute pose of the database image relative to a world coordinate system is known, the absolute pose of the new image can thus be determined.

Accordingly, the proposed scheme involves a hybrid of deep learning-based topological image matching and geometric PnP technique that enables an absolute metric pose of camera 120 (or the mapping agent) to be determined. The topological map may require a much smaller amount of memory for storage (e.g., up to an order of magnitude smaller) compared to that for a conventional map using vSLAM (e.g., ORBSLAM). Moreover, the proposed scheme may be more cost effective since a single camera, instead of more expense LIDAR detectors, can be used for localizing the camera (and the AV/drone/robot on which the camera is mounted) to a metric pose in the world coordinate frame. Additionally, under the proposed scheme, the map may be updated over time using images captured by a single camera. This may be achieved during each new traversal of any route on the map during the localization phase. Each new input image that is matched to a topological node may be added to an existing set of images corresponding to that node to result in a new set of images. Furthermore, with every traversal of the route, deep neural network 130 (e.g., a CNN) may be fine-tuned with the new set of images corresponding to each topological node. Advantageously, this allows the CNN to adapt to changes in the environment.

Figure 3:
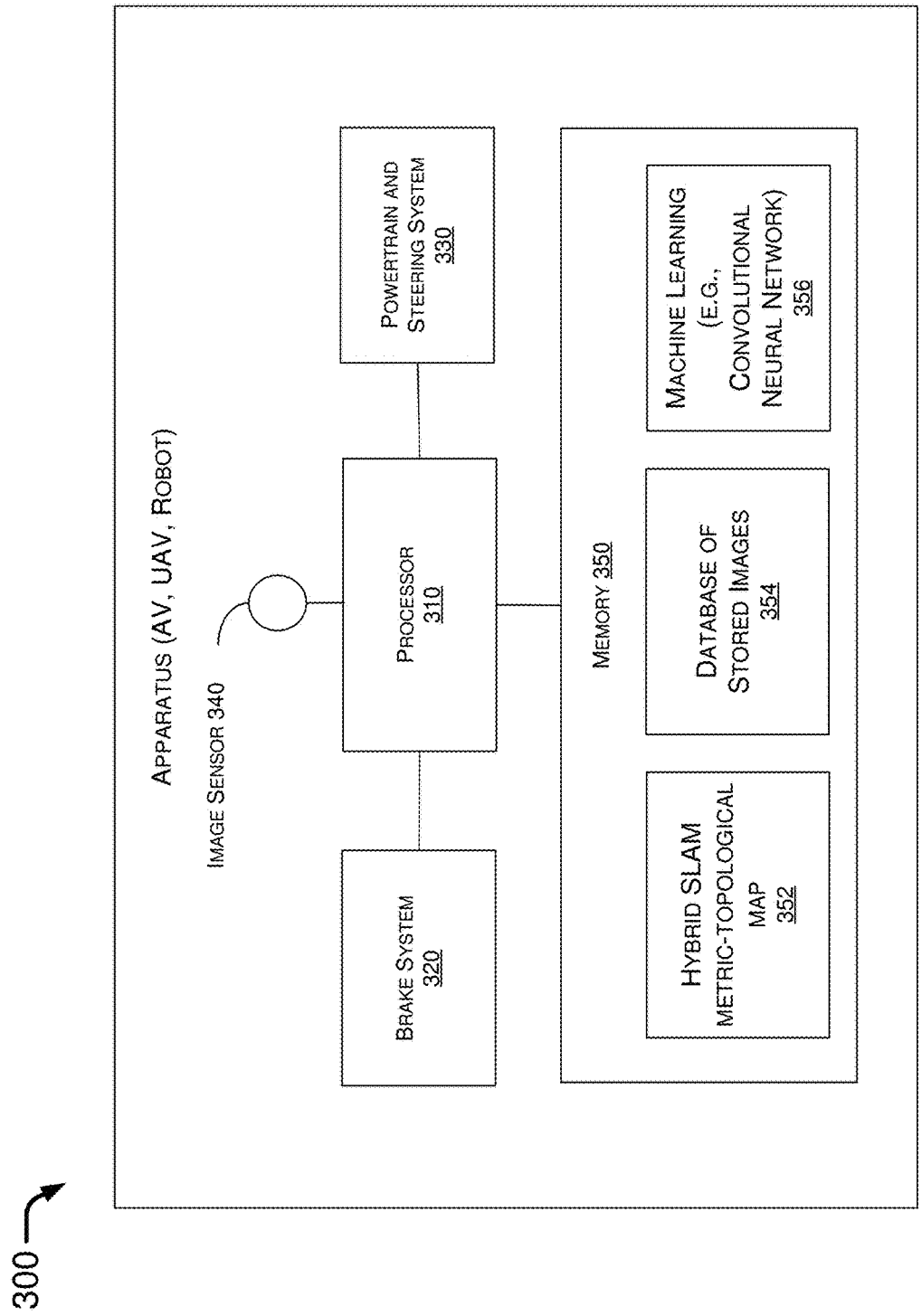
FIG. 3 is a diagram of an example apparatus in accordance with an embodiment of the present disclosure.

FIG. 3 illustrates an example apparatus 300 in accordance with an embodiment of the present disclosure. Apparatus 300 may include a number of components pertinent to the present disclosure as well as a number of components not directly pertinent to the present disclosure. Thus, in the interest of brevity and not obscuring illustration of pertinent components, FIG. 3 shows those components pertinent to various embodiments of the present disclosure without showing those components that are not directly pertinent to the present disclosure.

Referring to FIG. 3, apparatus 300 may include a processor 310, a brake system 320, a powertrain and steering system 330, a single image sensor 340, and a memory 350. Apparatus 300 may be an example implementation of an AV, UAV or robot as described herein.

Processor 310 may include one or more integrated-circuit (IC) chips. Brake system 320 may include a number of brakes, each for a respective one of the wheels of the vehicle (e.g., vehicle 110), and associated actuators. Each of the brakes of brake system 320 may be configured to inhibit a motion of the respective wheel to thereby slow and/or stop the respective wheel (and the vehicle). Powertrain and steering system 330 may include an engine, a transmission system, drive shafts, differentials, a steering system and a final drive system (e.g., wheels of the vehicle). Image sensor 340 may be capable of sensing, detecting or otherwise capturing images (e.g., still images and/or video images) of an environment in which image sensor 340 is located. Memory 350 may be accessible by processor 310 and capable of storing data (e.g., hybrid SLAM metric-topological map 352, database 354 of stored images, and instructions for executing a machine learning tool 356 such as CNN). Memory 350 may include a type of random-access memory (RAM) such as dynamic RAM (DRAM), static RAM (SRAM), thyristor RAM (T-RAM) and/or zero-capacitor RAM (Z-RAM). Alternatively, or additionally, memory 350 may include a type of read-only memory (ROM) such as mask ROM, programmable ROM (PROM), erasable programmable ROM (EPROM) and/or electrically erasable programmable ROM (EEPROM). Alternatively, or additionally, memory 350 may include a type of non-volatile random-access memory (NVRAM) such as flash memory, solid-state memory, ferroelectric RAM (FeRAM), magnetoresistive RAM (MRAM) and/or phase-change memory.

Under a proposed scheme in accordance with the present disclosure, processor 310 may receive data of an input image of an environment from a single image sensor 340. Additionally, processor 310 may localize the input image to one of a plurality of topological nodes of a hybrid SLAM metric-topological map (e.g., hybrid SLAM metric-topological map 352 stored in memory 350) which describes the environment as the plurality of topological nodes at a plurality of discrete locations in the environment.

In some embodiments, in localizing the input image to one of a plurality of topological nodes of hybrid SLAM metric-topological map 352, processor 310 may perform a number of operations. For instance, processor 310 may match the input image to the one of the plurality of topological nodes by deep learning-based image classification. Additionally, processor 310 may perform metric localization using: (a) 2D image features matched between the input image and a stored image for each of the topological nodes, and (b) one or more corresponding 3D real-world points. Moreover, processor 310 may determine a full 6DoF pose of the image sensor 340 in the environment.

Alternatively, or additionally, in localizing the input image, processor 310 may determine a metric pose of the image sensor 340 using a PnP projection algorithm.

In some embodiments, in performing the metric localization, processor 310 may perform a number of operations. For instance, processor 310 may determine a relative pose of the image sensor 340 using the 2D image features with respect to the stored image. Moreover, processor 310 may determine an absolute pose of the image sensor 340 based on an absolute pose of the stored image.

In some embodiments, processor 310 may train a CNN to localize the input image to one of the plurality of topological nodes and a direction of traversal through the environment.

In some embodiments, processor 310 may update hybrid SLAM metric-topological map 352 using one or more new input images captured by the single image sensor 340 during one or more subsequent traversal of the environment.

In some embodiments, processor 310 may construct hybrid SLAM metric-topological map 352 by performing a number of operations. For instance, processor 310 may perform the following: (a) maneuvering a mapping agent (e.g., apparatus 300 or an AV, UAV or robot) to traverse through the environment; (b) capturing a plurality of images of the environment of various views of the plurality of discrete locations in the environment using stereo vision or a depth sensor on the mapping agent; (c) constructing a topological map comprising a graph of the plurality of topological nodes with a respective metric pose of the mapping agent associated with each of the topological nodes; and (d) selecting one or more representative images from the plurality of images for each of the topological nodes.

In some embodiments, in maneuvering, processor 310 may maneuver the mapping agent (e.g., via powertrain and steering system 330 and brake system 320) to follow a predefined path when traversing through the environment.

In some embodiments, each of the one or more representative images may correspond to one or more 2D image keypoints and one or more depth values.

In some embodiments, each of the topological nodes may be connected to at least one other topological node of the plurality of topological nodes with a graph edge which is associated with two images from the plurality of images. Moreover, the two images may be captured in different directions during traversal of the environment by the mapping agent.

In some embodiments, processor 310 may maneuver apparatus 300 (e.g., via powertrain and steering system 330 and brake system 320) to traverse through the environment according to a result of the localizing.

FIG. 4 illustrates a flowchart depicting an example process 400 in accordance with an embodiment of the present disclosure. Process 400 may include one or more operations, actions, or functions shown as blocks such as 410 and 420 as well as sub-blocks 422, 424 and 426 of FIG. 4. Although illustrated as discrete blocks, various blocks/sub-blocks of process 400 may be divided into additional blocks, combined into fewer blocks, or eliminated, depending on the desired implementation. Moreover, some or all of the blocks/sub-blocks of FIG. 4 may be repeated. For illustrative purposes and without limitation, the following description of process 400 is provided with apparatus 300 implemented in or as an AV, UAV or robot. Process 400 may begin at block 410.

At 410, process 400 may involve processor 310 of apparatus 300 receiving data of an input image of an environment from a single image sensor 340. Process 400 may proceed from 410 to 420.

At 420, process 400 may involve processor 310 localizing the input image to one of a plurality of topological nodes of a hybrid SLAM metric-topological map which describes the environment as the plurality of topological nodes at a plurality of discrete locations in the environment.

In some embodiments, in localizing the input image to one of a plurality of topological nodes of a hybrid SLAM metric-topological map, process 400 may involve processor 310 performing a number of operations as represented by sub-blocks 422, 424 and 426.

At 422, process 400 may involve processor 310 matching the input image to the one of the plurality of topological nodes by deep learning-based image classification. Process 400 may proceed from 422 to 424.

At 424, process 400 may involve processor 310 performing metric localization using: (a) 2D image features matched between the input image and a stored image for each of the topological nodes, and (b) one or more corresponding 3D real-world points. Process 400 may proceed from 424 to 426.

At 426, process 400 may involve processor 310 determining a full 6DoF pose of the image sensor 340 in the environment.

Alternatively, or additionally, in localizing the input image, process 400 may involve processor 310 determining a metric pose of the image sensor 340 using a PnP projection algorithm.

In some embodiments, in performing the metric localization, process 400 may involve processor 310 performing a number of operations. For instance, process 400 may involve processor 310 determining a relative pose of the image sensor 340 using the 2D image features with respect to the stored image. Moreover, process 400 may involve processor 310 determining an absolute pose of the image sensor 340 based on an absolute pose of the stored image.

In some embodiments, process 400 may additionally involve processor 310 training a convolutional neural network (CNN) to localize the input image to one of the plurality of topological nodes and a direction of traversal through the environment.

In some embodiments, process 400 may additionally involve processor 310 updating the map using one or more new input images captured by the single image sensor 340 during one or more subsequent traversal of the environment.

In some embodiments, process 400 may additionally involve processor 310 constructing the hybrid SLAM metric-topological map by performing a number of operations. For instance, process 400 may involve processor 310 performing the following: (a) maneuvering a mapping agent (e.g., apparatus 300) to traverse through the environment; (b) capturing a plurality of images of the environment of various views of the plurality of discrete locations in the environment using stereo vision or a depth sensor on the mapping agent; (c) constructing a topological map comprising a graph of the plurality of topological nodes with a respective metric pose of the mapping agent associated with each of the topological nodes; and (d) selecting one or more representative images from the plurality of images for each of the topological nodes.

In some embodiments, in maneuvering, process 400 may involve processor 310 maneuvering the mapping agent to follow a predefined path when traversing through the environment.

In some embodiments, each of the one or more representative images may correspond to one or more 2D image keypoints and one or more depth values.

In some embodiments, each of the topological nodes may be connected to at least one other topological node of the plurality of topological nodes with a graph edge which is associated with two images from the plurality of images. Moreover, the two images may be captured in different directions during traversal of the environment by the mapping agent.

In some embodiments, process 400 may additionally involve processor 310 maneuvering apparatus 300, implemented as an AV, UAV or a robot, to traverse through the environment according to a result of the localizing.

In the above disclosure, reference has been made to the accompanying drawings, which form a part hereof, and in which is shown by way of illustration specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure.

What is claimed is:

1. A method, comprising:
   receiving data of an input image of an environment from a single image sensor;
   localizing the input image to one of a plurality of topological nodes of a hybrid simultaneous localization and mapping (SLAM) metric-topological map which describes the environment as the plurality of topological nodes at a plurality of discrete locations in the environment; and
   constructing the hybrid SLAM metric-topological map by performing operations comprising:
      maneuvering a mapping agent to traverse through the environment;
      capturing a plurality of images of the environment of various views of the plurality of discrete locations in the environment using stereo vision or a depth sensor ont the mapping agent;
      constructing a topological map comprising a graph of the plurality of topological nodes with a respective metric pose of the mapping agent associated with each of the topological nodes; and
      selecting one or more representative images from the plurality of images for each of the topological nodes.

2. The method of claim 1, wherein the localizing the input image comprises determining a metric pose of the image sensor using a Perspective-n-Point (PnP) projection algorithm.

3. The method of claim 1, wherein the localizing the input image to one of the plurality of topological nodes comprises matching the input image to the one of the plurality of topological nodes by deep learning-based image classification.

4. The method of claim 3, wherein the localizing the input image to one of the plurality of topological nodes further comprises:
   performing metric localization using:
      two-dimensional (2D) image features matched between the input image and a stored image for each of the topological nodes, and
      one or more corresponding three-dimensional (3D) real-world points; and
   determining a full six-degrees-of-freedom (6DoF) pose of the image sensor in the environment.

5. The method of claim 4, wherein the performing of the metric localization further comprises:
   determining a relative pose of the image sensor using the 2D image features with respect to the stored image; and
   determining an absolute pose of the image sensor based on an absolute pose of the stored image.

6. The method of claim 1, further comprising:
   training a convolutional neural network (CNN) to localize the input image to one of the plurality of topological nodes and a direction of traversal through the environment.

7. The method of claim 1, further comprising:
   updating the map using one or more new input images captured by the single image sensor during one or more subsequent traversal of the environment.

8. The method of claim 1, wherein the maneuvering comprises maneuvering the mapping agent to follow a predefined path when traversing through the environment.

9. The method of claim 1, wherein each of the one or more representative images corresponds to one or more two-dimensional (2D) image keypoints and one or more depth values.

10. The method of claim 1, wherein each of the topological nodes is connected to at least one other topological node of the plurality of topological nodes with a graph edge which is associated with two images from the plurality of images, and wherein the two images are captured in different directions during traversal of the environment by the mapping agent.

11. The method of claim 1, further comprising:
    maneuvering an autonomous vehicle (AV), an unmanned aerial vehicle (UAV) or a robot to traverse through the environment according to a result of the localizing.

12. An apparatus, comprising:
    a single image sensor capable of capturing an input image of an environment; and
    a processor coupled to receive data of the input image from the single image sensor, the processor configured to perform operations comprising:
    localizing the input image to one of a plurality of topological nodes of a hybrid simultaneous localization and mapping (SLAM) metric-topological map which describes the environment as the plurality of topological nodes at a plurality of discrete locations in the environment; and
    constructing the hybrid SLAM metric-topological map by performing operations comprising:
       maneuvering a mapping agent to traverse through the environment;
       capturing a plurality of images of the environment of various views of the plurality of discrete locations in the environment using stereo vision or a depth sensor on the mapping agent;
       constructing a topological map comprising a graph of the plurality of topological nodes with a respective metric pose of the mapping agent associated with each of the topological nodes; and
       selecting one or more representative images from the plurality of images for each of the topological nodes.

13. The apparatus of claim 12, wherein, in localizing the input image, the processor is capable of determining a metric pose of the image sensor using a Perspective-n-Point (PnP) projection algorithm.

14. The apparatus of claim 12, wherein, in localizing the input image to one of the plurality of topological nodes, the processor is capable of matching the input image to the one of the plurality of topological nodes by deep learning-based image classification.

15. The apparatus of claim 14, wherein, in localizing input image to one of the plurality of topological nodes, the processor is further capable of:
    performing metric localization using:
       two-dimensional (2D) image features matched between the input image and a stored image for each of the topological nodes, and
       one or more corresponding three-dimensional (3D) real-world points; and
    determining a full six-degrees-of-freedom (6DoF) pose of the image sensor in the environment.

16. The apparatus of claim 15, wherein, in performing the metric localization, the processor is further capable of:
   determining a relative pose of the image sensor using the 2D image features with respect to the stored image; and
   determining an absolute pose of the image sensor based on an absolute pose of the stored image.

17. The apparatus of claim 12, wherein the processor is further capable of training a convolutional neural network (CNN) to localize the input image to one of the plurality of topological nodes and a direction of traversal through the environment.

18. The apparatus of claim 12, wherein the processor is further capable of updating the map using one or more new input images captured by the single image sensor during one or more subsequent traversal of the environment.

19. The apparatus of claim 12, wherein the processor is further capable of maneuvering an autonomous vehicle (AV), an unmanned aerial vehicle (UAV) or a robot to traverse through the environment according to a result of the localizing.

* * * * *

UNITED STATES PATENT AND TRADEMARK OFFICE
CERTIFICATE OF CORRECTION

Page 1 of 1

PATENT NO.         : 10,885,666 B2
APPLICATION NO.    : 16/269333
DATED              : January 5, 2021
INVENTOR(S)        : Chakravarty et al.

It is certified that error appears in the above-identified patent and that said Letters Patent is hereby corrected as shown below:

In the Claims

Column 9, Line 30:
In Claim 1, the word "ont" should be corrected to "on".

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*